US010521653B2

(12) United States Patent
Yamashita et al.

(10) Patent No.: US 10,521,653 B2
(45) Date of Patent: Dec. 31, 2019

(54) IMAGE PROCESSING DEVICE, IMAGE PROCESSING METHOD, AND STORAGE MEDIUM

(71) Applicant: CANON KABUSHIKI KAISHA, Tokyo (JP)

(72) Inventors: Yutaka Yamashita, Shiroi (JP); Hisashi Kawabayashi, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 15/830,891

(22) Filed: Dec. 4, 2017

(65) Prior Publication Data

US 2018/0157905 A1 Jun. 7, 2018

(30) Foreign Application Priority Data

Dec. 7, 2016 (JP) .................................. 2016-237365

(51) Int. Cl.
*G06K 9/00* (2006.01)
*G06T 7/62* (2017.01)
*G06T 7/20* (2017.01)

(52) U.S. Cl.
CPC ............ *G06K 9/00369* (2013.01); *G06T 7/20* (2013.01); *G06T 7/62* (2017.01); *G06K 9/00288* (2013.01); *G06T 2207/30196* (2013.01)

(58) Field of Classification Search
CPC ..... B60C 23/009; B60C 23/06; B60C 23/063; G08B 13/1672; G08B 15/00
USPC ......................................... 382/103, 104, 118
See application file for complete search history.

(56) References Cited

U.S. PATENT DOCUMENTS 9,111,346 B2 * 8/2015 Adachi .................... G06T 7/74

FOREIGN PATENT DOCUMENTS

JP   2006-301847 A   11/2006
JP   2013-62688 A   4/2013

* cited by examiner

*Primary Examiner* — Charlotte M Baker
(74) *Attorney, Agent, or Firm* — Canon U.S.A., Inc. IP Division

(57) ABSTRACT

The present invention is directed to reducing a calculation amount for human body detection to achieve high speed processing. Detection processing is executed to detect a predetermined object in an image captured by an image capturing unit. When the predetermined object is detected using a pattern having a predetermined size, a partial area of the image is excluded from a processing region in which the detection processing of detecting the predetermined object is executed using the pattern having the predetermined size, based on a position at which the predetermined object is detected.

13 Claims, 12 Drawing Sheets

FIG. 12

| LAYER | COLLATION PATTERN SIZE (PIXELS) | NON-DETECTION AREA PATTERN | DETECTION START POSITION | INITIAL IMAGE |
|---|---|---|---|---|
| FIRST LAYER | 40,50 | J | LOWER LEFT | LARGE |
| SECOND LAYER | 25,45 | E | LOWER LEFT | LARGE |
| THIRD LAYER | 10,30 | E | LOWER LEFT | LARGE |

1200

IMAGE PROCESSING DEVICE, IMAGE PROCESSING METHOD, AND STORAGE MEDIUM

BACKGROUND OF THE INVENTION

Field of the Invention

The present invention relates to an image processing device, an image processing method, and a storage medium for executing human body detection.

Description of the Related Art

Pattern matching processing has been employed for detecting a human body, faces, and the like in an image captured by a monitoring camera. The pattern matching processing involves a large calculation amount, resulting in a long period of time required for the detection, because human bodies of various sizes need to be detected in the captured image. For example, detection processing includes cropping a human body in the captured image for identification, with the entire captured image scanned at various scales. For this reason, it is important to reduce the calculation amount as much as possible for each pattern matching. In view of this, various attempts have been made to reduce the calculation amount. Japanese Patent Application Laid-Open No. 2006-301847 discusses a technique related to face detection, involving a change in the size of the face to be detected from large to small. In this condition, an area where the face has already been detected is excluded from detection for a face of a different size. Japanese Patent Application Laid-Open No. 2013-62688 discusses detection processing, involving a change in the size of a human body to be detected from large to small, executed with the size of the human body to be detected associated with an area of a captured image.

SUMMARY OF THE INVENTION

According to an exemplary embodiment, an image processing device includes a detection unit configured to execute detection processing of detecting a predetermined object in an image captured by an image capturing unit, and an excluding unit configured to exclude, when the predetermined object is detected by the detection unit using a pattern having a predetermined size, a partial area of the image from a processing region in which the detection processing of detecting the predetermined object is executed using the pattern having the predetermined size, based on a position at which the predetermined object is detected.

Further features of the present disclosure will become apparent from the following description of exemplary embodiments with reference to the attached drawings.

BRIEF DESCRIPTION OF THE DRAWINGS

FIG. 12 is a diagram illustrating an example of a condition table.

DESCRIPTION OF THE EMBODIMENTS

Preferred exemplary embodiments are described in detail below with reference to the attached drawings. In exemplary embodiments, a case is described where a subject, which is a predetermined object to be detected, is a person. Note that the exemplary embodiments can also be applied to cases where the subject is other objects such as a face, an automobile, and an animal, for example.

Figure 1:
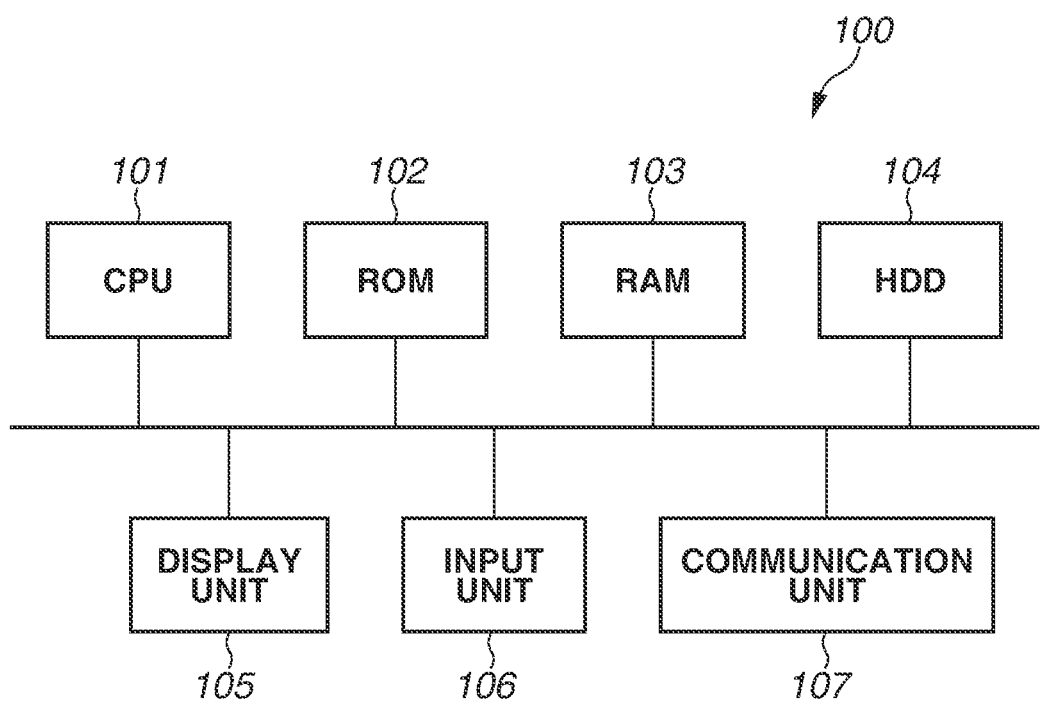
FIG. 1 is a block diagram illustrating a hardware configuration of an image processing device.

FIG. 1 is a block diagram illustrating a hardware configuration of an image processing device 100 according to a first exemplary embodiment. The image processing device 100 includes a central processing unit (CPU) 101, a read only memory (ROM) 102, a random access memory (RAM) 103, a hard disk drive (HDD) 104, a display unit 105, an input unit 106, and a communication unit 107. The CPU 101 reads out a control program stored in the ROM 102 and executes various types of processing. The RAM 103 is a temporary storage area, including a main memory and a work area, to be used by the CPU 101. The HDD 104 stores various types of data and various programs. The display unit 105 displays various types of information. The input unit 106 includes a keyboard and a mouse, and receives various operations by a user. The communication unit 107 executes processing of communicating with external devices through a network. Functions and processing executed by the image processing device 100 described below are executed by the CPU 101 reading out a program stored in the ROM 102 or the HDD 104, and executing the program.

Figure 2:
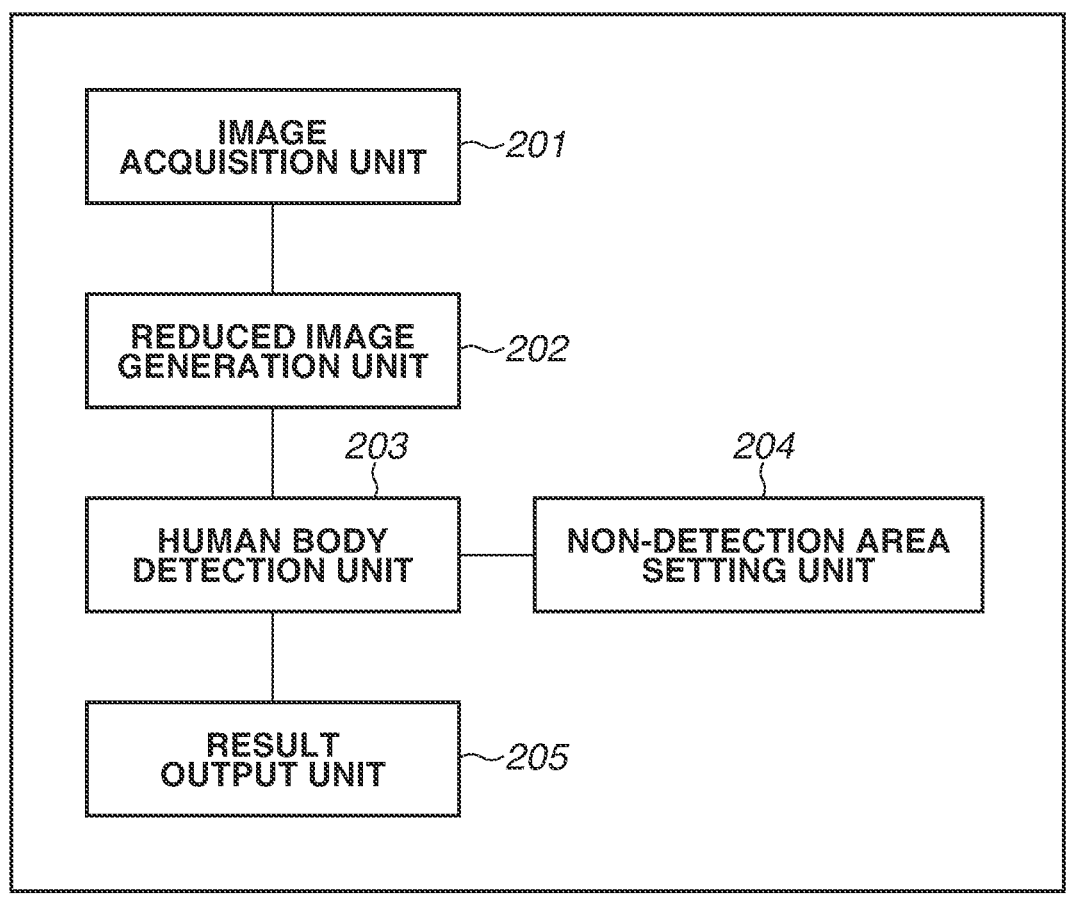
FIG. 2 is a block diagram illustrating a software configuration of the image processing device.

FIG. 2 is a block diagram illustrating a software configuration of the image processing device 100. An image acquisition unit 201 acquires an image supplied from an external supplier. The image may be a still image or a moving image. The supplier of the image is not particularly limited. Examples of the supplier include an image capturing device and a server device that supplies an image through wired or wireless communications. The supplier is not limited to an external supplier and may be a memory or the like in the image processing device 100. When a moving image is supplied to the image processing device 100, the image processing device 100 executes each processing on each frame included in the moving image.

Figure 3A:
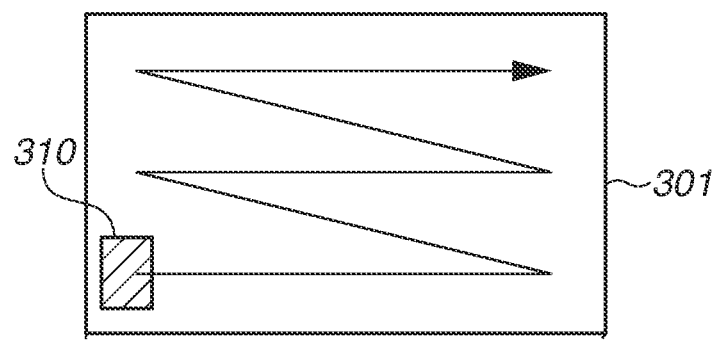
FIGS. 3A to 3C are diagrams illustrating reduced images.
Figure 3B:
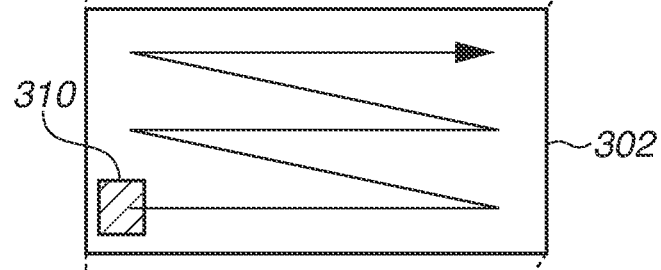
Figure 3C:
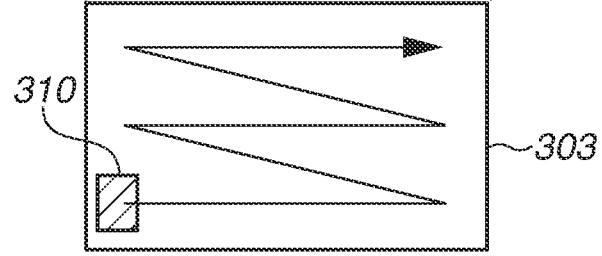

A reduced image generation unit 202 generates a reduced image based on an image acquired by the image acquisition unit 201. The image acquired by the image acquisition unit 201 is hereinafter referred to as a first image. FIG. 3 is a schematic view illustrating a reduced image. The reduced image generation unit 202 generates two reduced images, including a second image 302 and a third image 303, from the first image 301. The second image 302 has a lower resolution than the first image 301. The third image 303 has a lower resolution than the second image 302. Thus, the reduced image generation unit 202 recursively reduces the first image to generate the second image 302 and the third image 303 in different hierarchies and with different resolutions.

A human body detection unit 203 performs human body detection through pattern matching between a collation pattern and an area in an image. The collation pattern is a rectangular image including at least one of an approximate shape of an upper half of a human body (a shape of a sign Ω), an approximate shape of the entire human body, and an approximate shape of a face. The collation pattern is stored in a storage unit such as the HDD 104 in advance. In the present exemplary embodiment, the first processing target of the human body detection by the human body detection unit 203 is the third image 303. More specifically, the human body detection unit 203 sets the rectangular collation pattern 310 at a position where the rectangular collation pattern 310 is in contact with the lower left corner of the third image 303 as illustrated in FIG. 3, and executes the human body detection through the pattern matching between the collation pattern 310 and an image corresponding to the position. Then, the human body detection unit 203 executes the human body detection using the pattern matching each time the collation pattern 310 moves rightward in the third image 303 by a predetermined distance. The human body detection unit 203 repeatedly executes the human body detection through the pattern matching in the rightward direction serving as a main moving direction and an upward direction serving as a sub moving direction. After completing the human body detection processing in the third image 303, the human body detection unit 203 executes the human body detection, with the processing target changed to the second image 302. When the detection is completed in the second image 302, the human body detection is executed on the first image 301, which is the final processing target.

The human body detection unit 203 repeats the human body detection processing through moving the collation pattern 310 across the image as described above, but the human body detection unit 203 does not need to execute the human body detection over the entire areas of the images 301 to 303. For example, the pattern matching may be terminated when a predetermined time elapses after the human body detection unit 203 has started moving the collation pattern 310. Furthermore, the processing may be terminated when the number of times the human body detection processing is executed reaches a threshold.

By performing the human body detection while moving the collation pattern 310 across the images in different hierarchies and with different resolutions, human bodies of various sizes can be detected. The reduced image generation unit 202 may generate more than two images.

When the human body detection unit 203 detects a human body, a non-detection area setting unit 204 sets a non-detection area based on an area where the human body is detected. The non-detection area is a part of an image in which the human body detection processing is to be executed by the human body detection unit 203, and the human body detection processing is omitted (skipped) in the non-detection area. Furthermore, a result output unit 205 outputs, as a detection result, information indicating areas where a human body has been detected, areas where a human body has not been detected, and a position where a human body has been detected, based on the detection of a human body by the human body detection unit 203. The information is output to a destination that is not particularly limited. More specifically, the information may be output to an external device through wireless or wired communications. The external device includes a display device such as a display. The information may be directly output, or may be visualized as graphics to be output.

Figure 4:
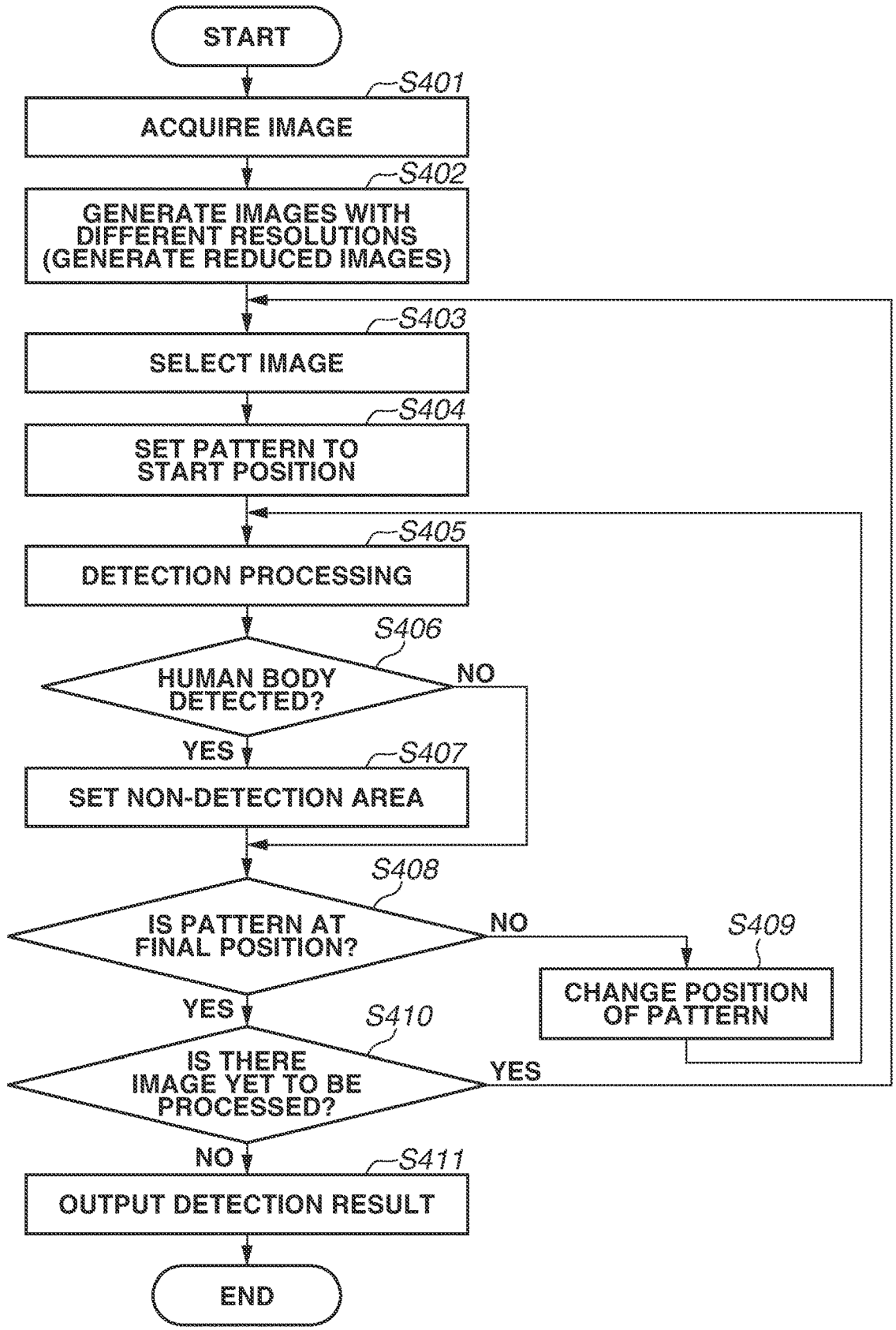
FIG. 4 is a flowchart illustrating image processing.

FIG. 4 is a flowchart schematically illustrating the human body detection processing to be executed by the image processing device 100. In step S401, the image acquisition unit 201 acquires an image (first image) from the external supplier. Then, in step S402, the reduced image generation unit 202 generates the second image and the third image from the first image. In step S403, the human body detection unit 203 selects the third image 303 as the processing target. In the present exemplary embodiment, human bodies are detected in a descending order of size, and thus the images are selected in an ascending order of resolution. Alternatively, the images may be selected in a descending order of resolution.

Next, in step S404, the human body detection unit 203 sets the collation pattern at the start position on the lower left corner of the third image 303. Then, in step S405, the human body detection unit 203 executes the human body detection processing using the pattern matching between the collation pattern and an image of the area corresponding to the pattern. When the human body detection unit 203 detects a human body (Yes in step S406), the processing proceeds to step S407. On the other hand, when the human body detection unit 203 detects no human body (No in step S406), the processing proceeds to step S408. In step S407, the non-detection area setting unit 204 sets the non-detection area based on a position where a predetermined object has been detected in step S405. In step S408, the human body detection unit 203 determines whether the collation pattern is at the final position in the selected image. When the collation pattern is at the final position (Yes in step S408), the processing proceeds to step S410. When the collation pattern is not at the final position, that is, when there is an area yet to be processed by the human body detection unit 203 (No in step S408), the processing proceeds to step S409.

In step S409, the human body detection unit 203 changes the position of the collation pattern, and the processing returns to step S405. More specifically, in step S409, the human body detection unit 203 moves the collation pattern rightward as described above with reference to FIG. 3. When the collation pattern is at the right end of the image, the human body detection unit 203 moves the collation pattern back to the left end and moves the collation pattern upward to the next row on the upper side. Through this processing, the human body detection unit 203 can execute the detection processing while moving the collation pattern across the selected image. The human body detection unit 203 is controlled in such a manner that when a non-detection area is set in the selected image in step S407, the non-detection area is excluded from a processing region where the detection processing is to be executed. More specifically, the human body detection unit 203 sets the collation pattern at a position at which the collation pattern does not overlap the non-detection area. The human body detection unit 203 considers the non-detection area as an area that has already been processed.

In step S410, the human body detection unit 203 determines whether there is an image yet to be processed, where the pattern matching with the collation pattern has not been performed, in a group of images including the image acquired in step S401 and the images generated in step S402. When there is an image yet to be processed (Yes in step S410), the processing returns to step S403. Then, in step S403, the human body detection unit 203 selects an image yet to be processed as the processing target, and executes processing in and after step S404 on the image. On the other hand, when there is no image yet to be processed (No in step S410), the processing proceeds to step S411. In step S411, the result output unit 205 outputs a result of the detection processing, and the human body detection processing is terminated.

Figure 5A:
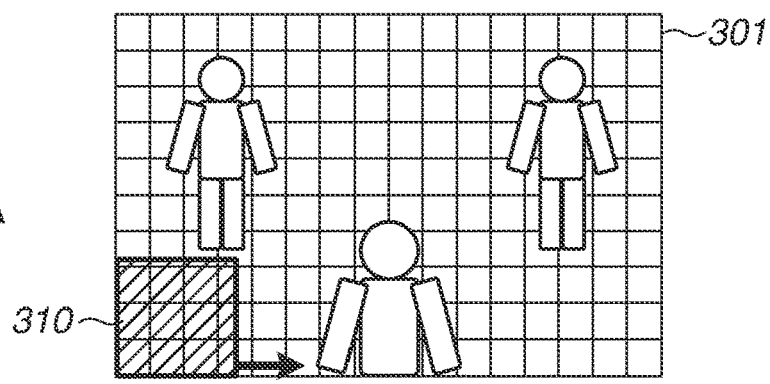
FIGS. 5A to 5D are diagrams illustrating the image processing.
Figure 5B:
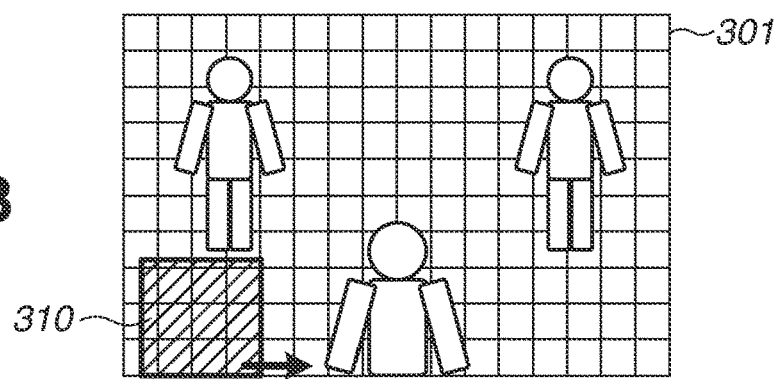
Figure 5C:
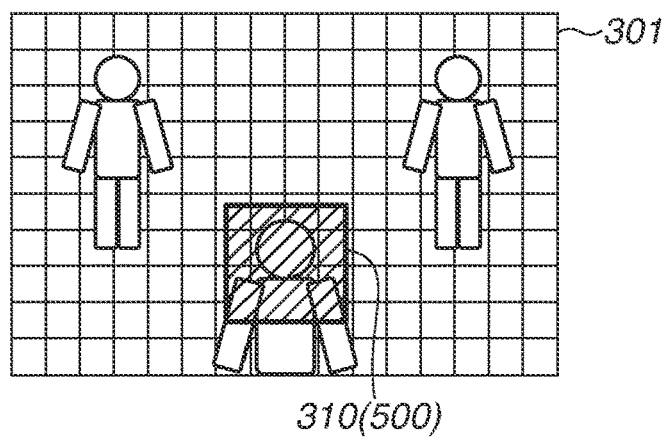

The processing in steps S404 to S409, to be executed when the first image 301 is selected as the processing target, is described in detail with reference to FIG. 5. FIG. 5A is a diagram illustrating a state where the collation pattern 310 is set at the start position in step S404. When no human body is detected at the start position, the collation pattern 310 is moved rightward by a predetermined distance in step S409, as illustrated in FIG. 5B. The detection processing is repeated as the collation pattern 310 is moved, and a human body is detected when the collation pattern 310 is at a position 500 as illustrated in FIG. 5C. In this case, in step S407, the non-detection area setting unit 204 sets a non-detection area.

Figure 5D:
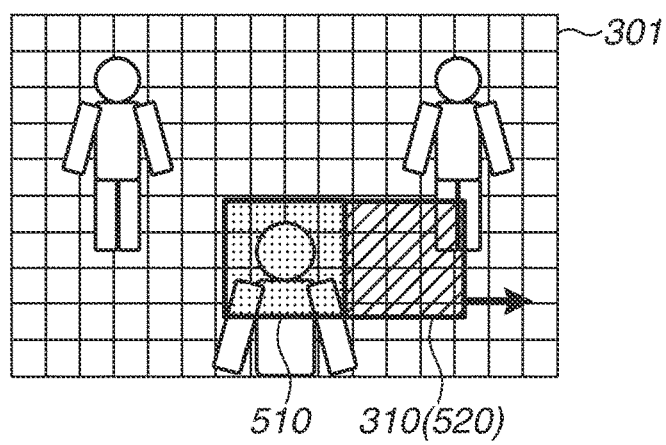

As illustrated in FIG. 5D, in the present exemplary embodiment, the non-detection area setting unit 204 sets an area where the human body is detected (an area where the collation pattern 310 is disposed when the human body is detected) as a non-detection area 510. In other words, the size and the position of the non-detection area are the same as those of the collation pattern 310. The collation pattern 310 is set not to overlap with the non-detection area 510. Thus, in the next step S409, the human body detection unit 203 moves the collation pattern 310 to a position 520.

Assuming no other human bodies are likely to be around the area where a human body is detected, the image processing device 100 according to the present exemplary embodiment sets the non-detection area based on the area where the human body is detected, and skips the human body detection processing in the non-detection area. As a result, a calculation amount for the human body detection can be reduced to achieve high speed processing.

Figure 6A:
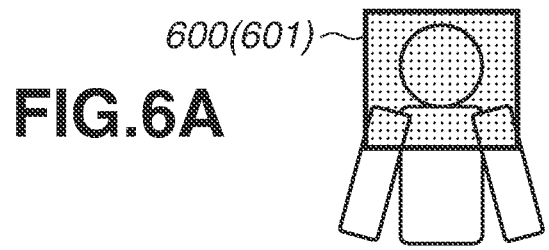
FIGS. 6A to 6H, 6J and 6K are each a diagram illustrating an example of a non-detection area.
Figure 6B:
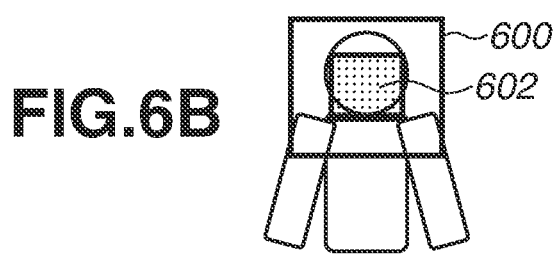
Figure 6C:
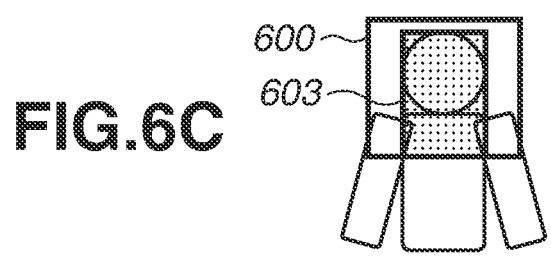

The first exemplary embodiment may be modified in various ways. More specifically, the size and the position of the non-detection area are not limited to those in the exemplary embodiment, and may be larger or smaller than the collation pattern. FIGS. 6A to 6C are diagrams illustrating an example of non-detection area patterns. FIG. 6A illustrates a non-detection area 601 having the same size and being set at the same position as a human body detection area 600. The non-detection area thus set is effective when a subject is detected based on a contour. Examples of such a case include a case where a face is detected and a case where a person is detected from the above. FIG. 6B illustrates a non-detection area 602 with a smaller size than the human body detection area 600. More specifically, the non-detection area 602 has the same center as the human body detection area 600, but has half the width and height of the human body detection area 600. In other words, the non-detection area 602 is within the human body detection area 600.

Figure 6D:
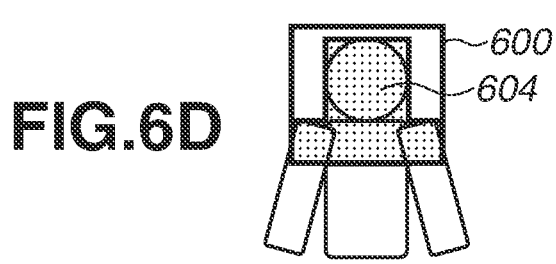
Figure 6E:
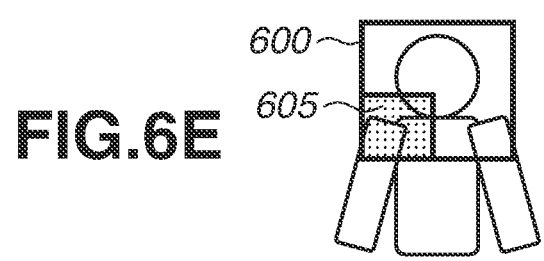
Figure 6F:
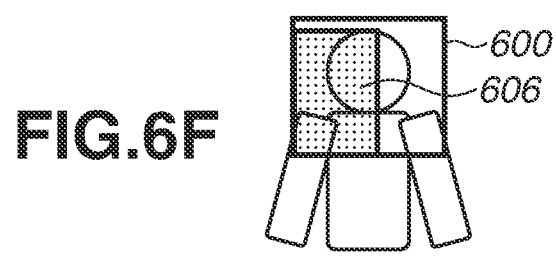

FIG. 6C illustrates a non-detection area 603 having a size corresponding to a width of a human head. FIG. 6D illustrates a non-detection area 604 including the non-detection area 603 in FIG. 6C and an area corresponding to the shoulders. These non-detection areas are effective in a situation where it is assumed that there is no person in front of a detected person, under a condition that the pattern matching using the collation pattern is executed in the descending order of size. FIG. 6E illustrates a non-detection area 605 that is effective when the main moving direction and the sub moving direction of the collation pattern are respectively the rightward and the upward directions. FIG. 6F illustrates a non-detection area 606 that is an example as a result of moving the non-detection area 603 in FIG. 6C leftward. This is effective when no person is assumed to be on the right side of a human body detected area in the real space, with the main moving direction and the sub moving direction of the collation pattern respectively being the rightward and the upward directions, meaning that the already processed area would be on the left side. In this way, the non-detection pattern may be determined based on the moving direction of the collation pattern.

Figure 6G:
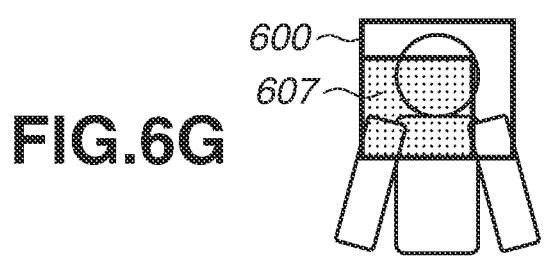
Figure 6H:
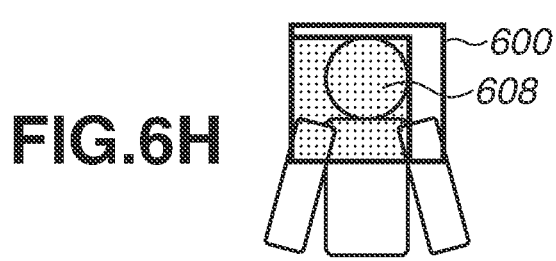
Figure 6J:
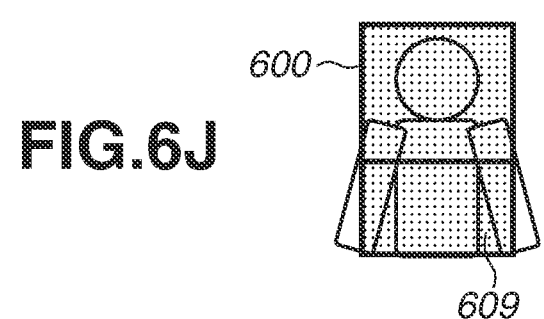
Figure 6K:
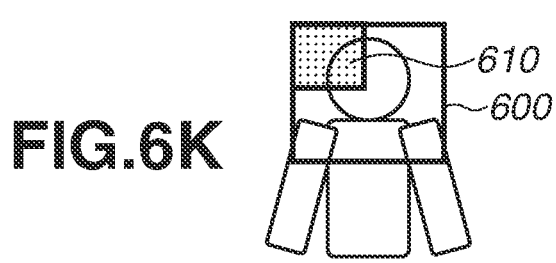

FIG. 6G and FIG. 6H illustrate a non-detection area 607 and a non-detection area 608 that may be effective for detecting a relatively large person, depending on a condition of installing a monitoring camera, when detection has been successful with the areas in FIG. 6E and FIG. 6F. FIG. 6J illustrates a non-detection area 609 that is effective when the collation pattern is relatively large, under the same condition as that where the area in FIG. 6A is used for the detection. More specifically, the non-detection area 609 is set based on a condition that a captured image of a human body may be larger than the detected human body and that it is reasonable to believe that no person would be in front of a person the human body of which has been detected. FIG. 6K illustrates a non-detection area 610 that is set at the upper left when the detection start position is set at the upper left, for example.

Figure 7A:
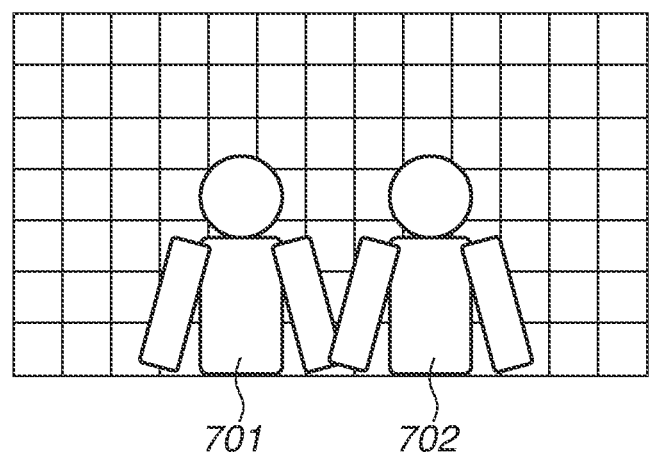
FIGS. 7A and 7B are diagrams illustrating processing of setting the non-detection area.
Figure 7B:
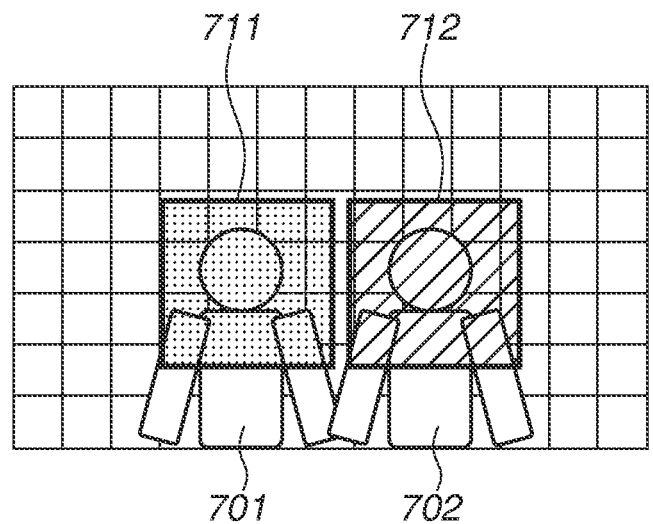

Now, a first example where the non-detection area is set according to the pattern illustrated in FIG. 6E is described. In this first example, the processing target is an image of an entrance of a small store, captured by a monitoring camera. FIG. 7A illustrates an example of an image, serving as the processing target, including two persons 701 and 702 holding hands. When the human body detection processing is executed on this image, the first person 701 is detected in a first area 711 as illustrated in FIG. 7B. Then, the first area 711 is set as the non-detection area according to the pattern illustrated in FIG. 6A. In other words, in the example illustrated in FIG. 7B, the collation pattern is set at a second area 712, to circumvent the first area 711, resulting in another successful detection of the human body of the second person 702.

Figure 8A:
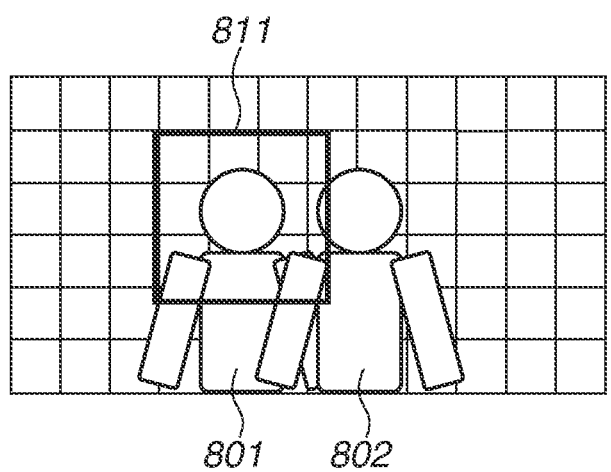
FIGS. 8A to 8C are diagrams illustrating the processing of setting the non-detection area.
Figure 8B:
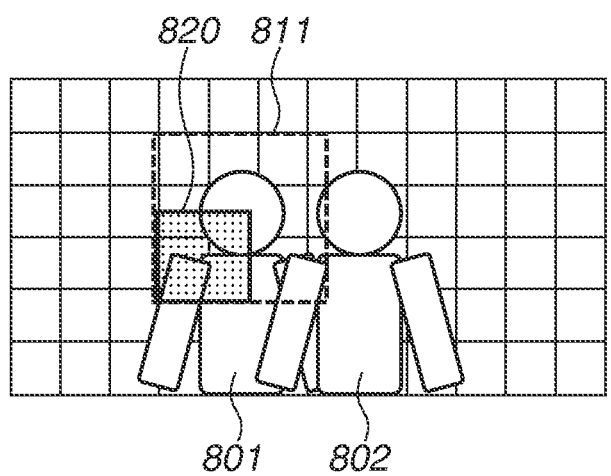
Figure 8C:
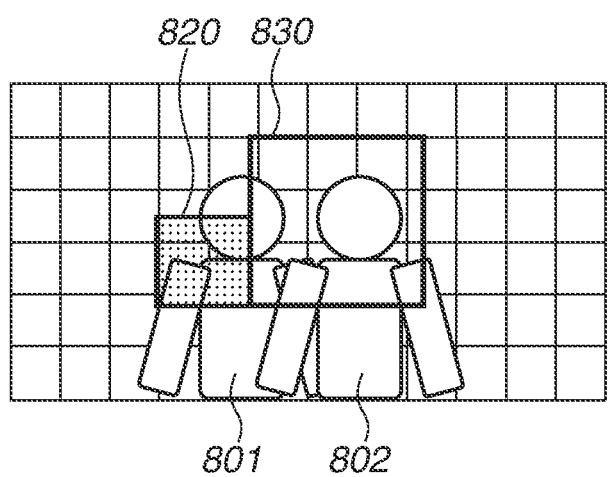

FIG. 8A illustrates another image including two persons 801 and 802 holding arms or cuddling close to each other. In such a case, the two persons 801 and 802 are so close to each other that the second person 802 cannot be detected when a non-detection area having a size corresponding to a human shoulder length is set. For this reason, the non-detection area 820 corresponding to the pattern illustrated in FIG. 6E is set as illustrated in FIG. 8B. The non-detection area 820 has half the width and height of the human body detection area 811 in which the human body of the first person 801 is detected, and has the lower left corner set at the same position as the lower left corner of the human body detection area 811. The non-detection area 820 is set at the lower left of the human body detection area 811, due to the condition that the detection start position is at the lower left and the directions in which the detection position is moved are the rightward and the upward directions. In such a case, a position at which the collation pattern is to be set subsequent to the human body detection area 811 is a position 830 in FIG. 8C. In this way, the second person 802 is also successfully detected.

Figure 9A:
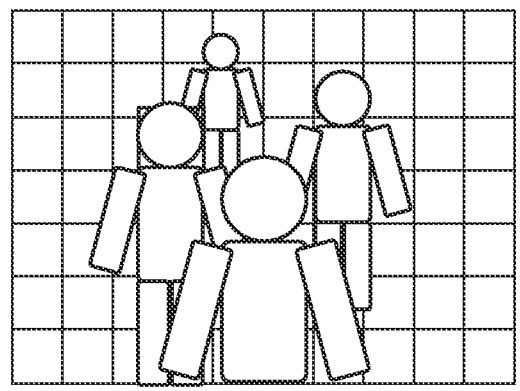
FIGS. 9A to 9C are diagrams illustrating the processing of setting the non-detection area.
Figure 9B:
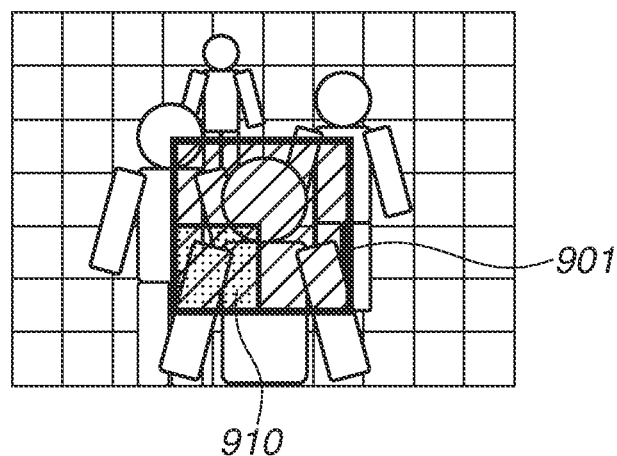

Next, a second example where the non-detection area is set according to the pattern illustrated in FIG. 6E is described. In the second example, the processing target is an image including persons overlapped in a direction of the camera. FIG. 9A illustrates an example of an image, as the processing target, including persons overlapping along the camera direction, captured by a downward looking monitoring camera.

Figure 9C:
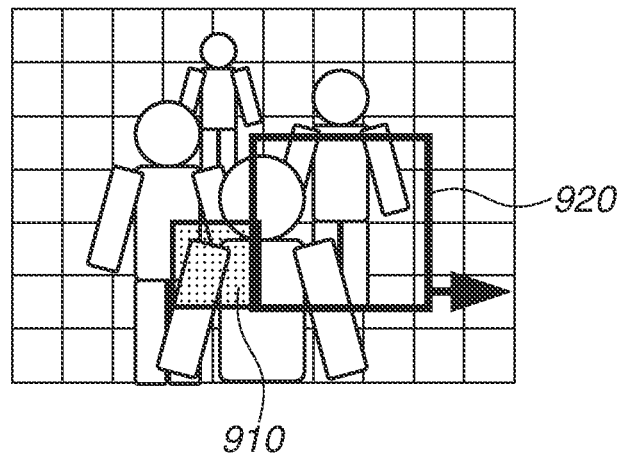

In the image illustrated in FIG. 9A, a person closer to the camera appears to be larger in the image, and a person farther from the camera appears to be smaller in the image. Also in this case, a non-detection area 910 corresponding to the pattern in FIG. 6E is set. The non-detection area 910 has half the height and half the width of a human body detection area 901, and has the lower left corner set at the same position as the lower left corner of the human body detection area 901. The non-detection area 910 is set at the lower left of the human body detection area 901, due to the condition that the detection start position is at the lower left and the directions in which the detection position is moved are the rightward and the upward directions. In such a case, a position at which the collation pattern is to be set subsequent to the human body detection area 901 is a position 920 in FIG. 9C. In this way, a person farther from the camera is successfully detected.

Next, an image processing device 100 according to a second exemplary embodiment is described. An image to be processed by the image processing device 100, according to the second exemplary embodiment, is an image including persons having different sizes depending on their positions in the image, captured by the downward looking monitoring camera. The description is given below on points different from the first exemplary embodiment, and points that are the same as those in the first exemplary embodiment will not be described.

Figure 10:
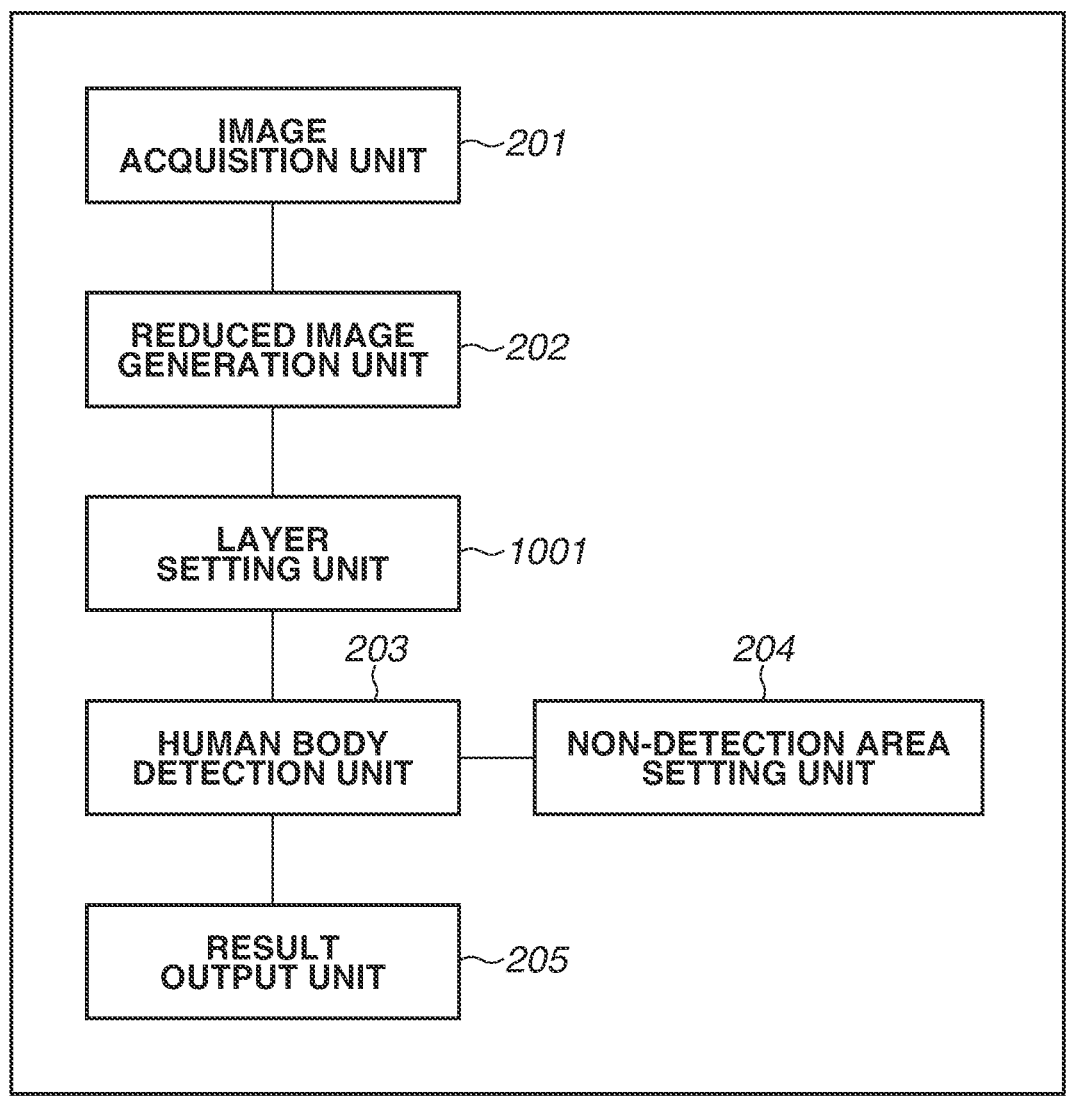
FIG. 10 is a block diagram illustrating a software configuration of an image processing device.

FIG. 10 is a diagram illustrating a software configuration of the image processing device 100 according to the second exemplary embodiment. In the figure, the components that are the same as those in the first exemplary embodiment are denoted by the same reference numerals. A layer setting unit 1001 sets a plurality of layers for the processing target image, and sets a condition table indicating a processing condition for each layer, in response to an input operation on an input unit 106. This processing is an example of layer setting processing and condition setting processing. A human body detection unit 203 executes the human body detection processing on a layer-by-layer basis in accordance with the processing conditions set in the condition table. A non-detection area setting unit 204 sets a non-detection area, by determining the non-detection area according to the processing condition set in the condition table, for each layer.

Figure 11A:
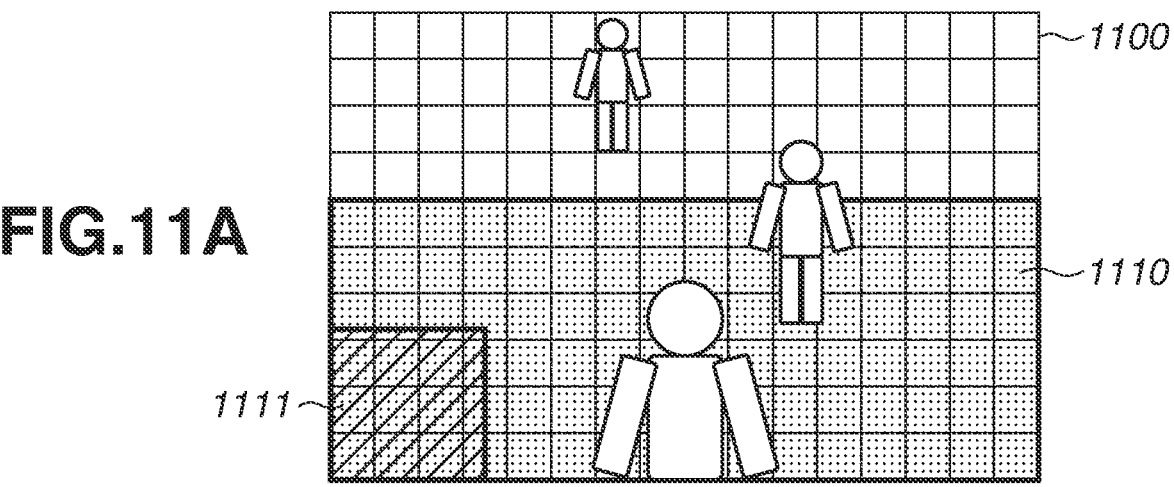
FIGS. 11A to 11C are diagrams illustrating examples of setting layers.
Figure 11B:
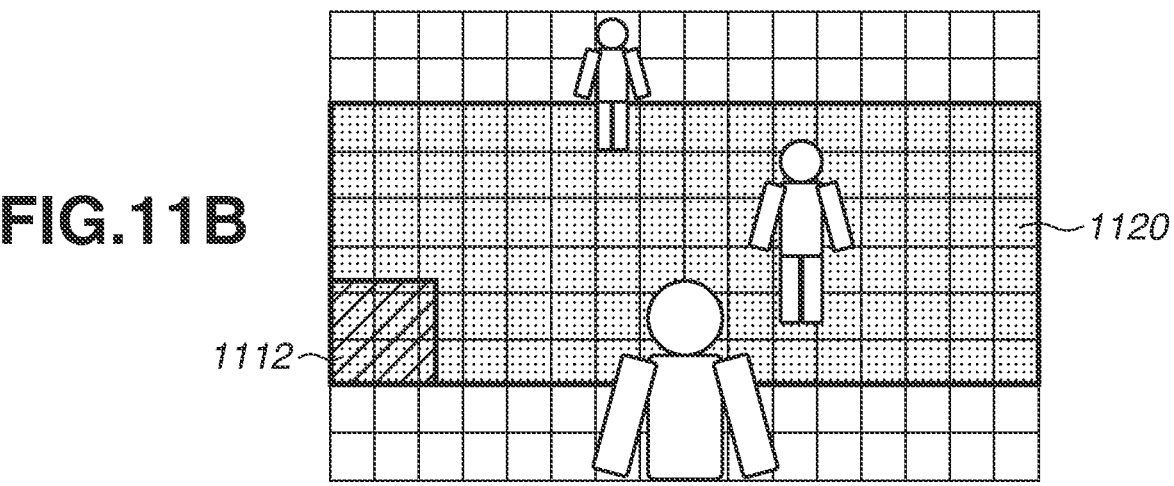
Figure 11C:
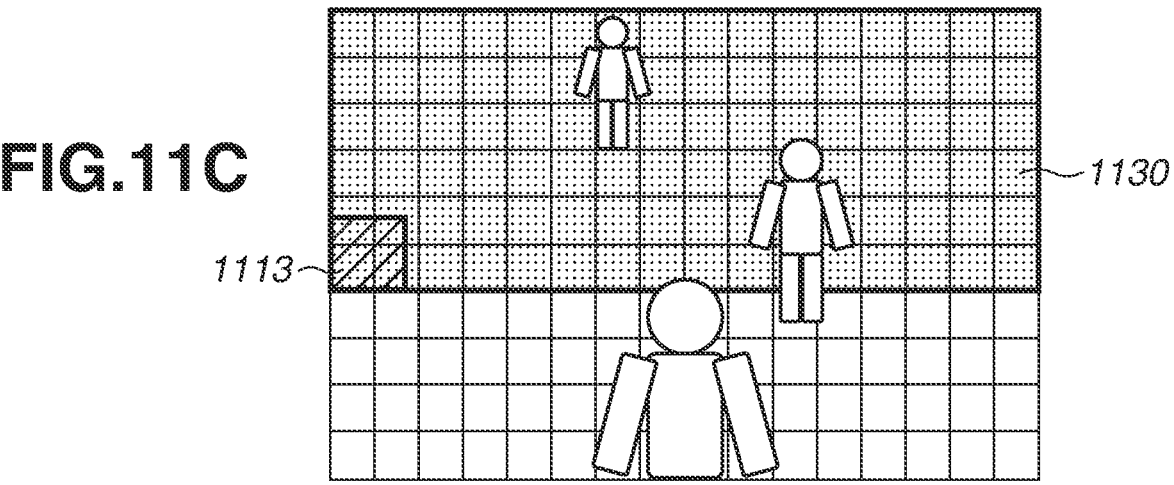

FIGS. 11A to 11C are diagrams illustrating an example of how the layers are set. More specifically, FIGS. 11A to 11C illustrate an example where a first layer 1110 illustrated in FIG. 11A, a second layer 1120 illustrated in FIG. 11B, and a third layer 1130 illustrated in FIG. 11C are set. The first layer 1110 corresponds to an area of the captured image including a human body close to the monitoring camera. In such an area, the human body as the subject has a relatively large size. In the second layer 1120, the human body has a medium size. In the third layer 1130, the human body has a relatively small size. The number of layers and the positions of the layers in the image are not limited to those in the present exemplary embodiment. In the present exemplary embodiment, the layers partially overlap. In another example, the layer setting unit 1001 may set layers that do not overlap with each other.

In the first layer 1110, a collation pattern 1111 is set. In the second layer 1120, a collation pattern 1112 is set. In the third layer 1130, a collation pattern 1113 is set. The sizes of the collation patterns 1111, 1112, and 1113 are set by a user operation. A size range can be set for each collation pattern. For example, the collation pattern 1111 can be set to have a size within a range between the size of the collation pattern 1111 and the size of the collation pattern 1112. The human body detection unit 203 may use information, indicating the human body detected with the collation pattern from one image, in another image with a different resolution to set the non-detection area.

FIG. 12 is a diagram illustrating an example of the condition table. In this condition table 1200, processing conditions for the layers are set. The processing conditions each include "collation pattern size", "non-detection area pattern", "detection start position", and "initial image". The "collation pattern size" indicates a range of the size of the collation pattern set by the user in accordance with a size of the human body to be detected. For example, a range between 40 pixels (minimum size) and 50 pixels (maximum size) is set for the first layer.

The "non-detection area pattern" indicates the position of the non-detection area (where the human body detection is to be skipped) relative to the area where the human body is detected, that is, the position of the collation pattern with which the human body is detected. The user sets a desired one of the plurality of non-detection area patterns, illustrated in FIG. 6, for each layer. The non-detection area may not be set for some layers. The "non-detection area pattern" is blank for such layers. For example, "J", corresponding to the non-detection area pattern illustrated in FIG. 6J, is set as the non-detection area pattern for the first layer. The "detection start position" indicates the initial position at which the collation pattern is set in the image. The "initial image" indicates a first image to be processed among a plurality of images with different resolutions, and "large" indicates that large-size human body detection is first executed. Thus, the initial image would be an image that has been reduced the most.

For example, the processing condition is set as follows for a layer the detection of which starts with a small collation pattern. More specifically, the "initial image" is set to be "small", the "detection start position" is set to be "upper left", and the "non-detection area pattern" is set to be the pattern illustrated in FIG. 6K. The human body detection unit 203 uses information obtained from this image, regarding detection using the collation pattern, in an image with a different resolution to be selected next to set the non-detection area. The human body detection unit 203 can also select a non-detection area pattern to set the non-detection area for the image with the different resolution to be next selected. For example, when the non-detection area pattern illustrated in FIG. 6J is set for the first layer, the non-detection area pattern illustrated in FIG. 6B can be set for the image with a different resolution to be selected next as the processing target, to set the non-detection area.

An area where no human body is detected may be recognizable in advance, depending on an environment in which the monitoring camera is installed. In such a case, a non-detection area may be set in advance so that high speed processing can be achieved. Preferably, the "detection start position" and the "non-detection area pattern" are set for each layer, while taking the area where no human body is detected into consideration. The configuration and the processing of the image processing device 100 according to the second exemplary embodiment other than those described above are the same as those of the image processing device 100 according to the first exemplary embodiment.

A modification of the second exemplary embodiment is described below. A video captured by a monitoring camera does not necessarily include a person. Thus, the image processing device 100 may execute moving body detection processing on a processing target image, and set only an area where a moving body is detected as the processing region on which the human body detection is to be executed. This processing is an example of region setting processing. The human body detection unit 203 executes the human body detection processing within the processing region. The human body detection unit 203 may select a non-detection area pattern in accordance with a result of the moving body detection processing. For example, the human body detection unit 203 determines a density of people in accordance with the position and the size obtained by the moving body detection, as well as information on each layer. Thus, the human body detection unit 203 may execute the human body detection with the non-detection area pattern illustrated in FIG. 6A set for an area determined to include a single person, and with the non-detection area pattern illustrated in FIG. 6E set for an area determined to include more than one person. In this way, high speed human body detection can be executed on an image of crowded people, without compromising the accuracy.

Although the exemplary embodiments of the present invention are described above in detail, the present invention is not limited to these specific exemplary embodiments, and can be modified and varied in various ways without departing from the gist of the present invention described in the scope of claims.

Exemplary embodiments may be implemented through processing including supplying a program for implementing one or more functions according to the exemplary embodiments described above, to a system or an apparatus through a network or a storage medium, and reading and executing the program by one or more processors in a computer of the system or the apparatus. Furthermore, the exemplary embodiments may be implemented with a circuit (for example, an application specific integrated circuit (ASIC)) that implements the one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-237365, filed Dec. 7, 2016, which is hereby incorporated by reference herein in its entirety.

What is claimed is:

1. An image processing device comprising:
   a detection unit configured to execute detection processing of detecting a predetermined object in a target image captured by an image capturing unit, by sequentially moving a detection area in which pattern matching is performed in the target image and sequentially detecting the predetermined object from the detection area; and
   a determination unit configured to determine a skip area in which the pattern matching is skipped in the target image if the predetermined object is detected from the detection area in the target image by the detection unit, the skip area including at least a partial area of the detection area from which the predetermined object is detected,
   wherein the detection unit moves the detection area in the target image so as to skip the pattern matching for the skip area in the detection processing after the predetermined object is detected from the detection area in the target image.

2. The image processing device according to claim 1, wherein the skip area has a size that is set in advance.

3. The image processing device according to claim 2, wherein the size of the skip area is smaller than a size of the detection area.

4. The image processing device according to claim 3, wherein the skip area is an area within the detection area and is determined based on a moving direction of the detection area.

5. The image processing device according to claim 2, wherein the size of the skip area is equal to a size of the detection area.

6. The image processing device according to claim 5, wherein the skip area is the detection area.

7. The image processing device according to claim 2, wherein the size of the skip area is larger than a size of the detection area.

8. The image processing device according to claim 7, wherein the skip area includes an entire area of the detection area.

9. The image processing device according to claim 1, further comprising:
   a layer setting unit configured to set a plurality of layers for the target image, and
   wherein the determination unit is configured to determine the skip area for each of the layers in the target image based on a condition for setting the skip area, the condition being different among the layers.

10. The image processing device according to claim 9, further comprising a condition setting unit configured to set the condition for each of the layers, based on a user operation.

11. The image processing device according to claim 1, further comprising an area setting unit configured to set an area, in the target image, where a moving object is detected as a processing area in which the detection processing is to be executed, wherein the detection unit is configured to execute the detection processing in the processing area set by the area setting unit.

12. An image processing method executed by an image processing device, the method comprising:

executing detection processing of detecting a predetermined object in a target image captured by an image capturing unit, by sequentially moving a detection area in which pattern matching is performed in the target image and sequentially detecting the predetermined object from the detection area; and determining a skip area in which the pattern matching is skipped in the target image if the predetermined object is detected from the detection area in the target image, the skip area including at least a partial area of the detection area from which the predetermined object is detected, wherein the detection area is moved in the target image so as to skip the pattern matching for the skip area in the detection processing after the predetermined object is detected from the detection area in the target image.

13. A non-transitory storage medium storing a program for causing a computer to execute an image processing method, the method comprising:

executing detection processing of detecting a predetermined object in a target image captured by an image capturing unit, by sequentially moving a detection area in which pattern matching is performed in the target image and sequentially detecting the predetermined object from the detection area; and determining a skip area in which the pattern matching is skipped in the target image if the predetermined object is detected from the detection area in the target image, the skip area including at least a partial area of the detection area from which the predetermined object is detected, wherein the detection area is moved in the target image so as to skip the pattern matching for the skip area in the detection processing after the predetermined object is detected from the detection area in the target image.

* * * * *